(No Model.)
R. W. TRAYLOR.
JOURNAL BOX.
No. 334,490. Patented Jan. 19, 1886.
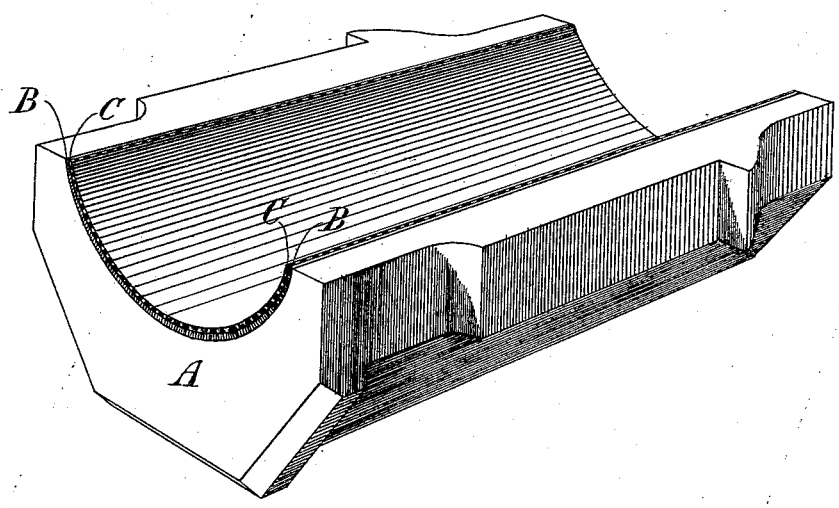
WITNESSES
WALTER R. HIGHAM
W. C. SHEPPARD
INVENTOR
Robert W. Traylor

UNITED STATES PATENT OFFICE.

ROBERT W. TRAYLOR, OF RICHMOND, VIRGINIA.

JOURNAL-BOX.

SPECIFICATION forming part of Letters Patent No. 334,490, dated January 19, 1886.

Application filed December 21, 1885. Serial No. 186,408. (No model.)

*To all whom it may concern:*

Be it known that I, ROBERT W. TRAYLOR, a citizen of the United States, residing at Richmond, in the county of Henrico and State of Virginia, have invented certain new and useful Improvements in Journal Boxes or Bearings, of which the following is a specification, reference being had to the accompanying drawing.

The nature of my invention consists in the construction of a journal box or bearing for railroad-car axle, engine, and other machinery, as will be hereinafter more fully set forth.

My object is to provide a bearing with an anti-friction surface, and at the same time let the anti-friction metal quickly adjust itself by reason of its soft cushion of lead to the irregularities of an axle or journal.

In order to enable others skilled in the art to which my invention appertains to make and use the same, I will now proceed to describe its construction and operation, referring to the annexed drawing.

The drawing represents a perspective view of my bearing.

A represents the end of the brass bearing. $b\ b$ represent the visible line of the lead cushion, and $c\ c$ represent the end view of the Babbitt.

To cast or form the journal box or bearing, I take an ordinary brass bearing or bearing of like composition and tin its bearing-surface. I then place and fasten a proper form with a convex face near to the bearing-face of the bearing, leaving between the bearing-surface and the convex face a suitable space, into which the melted lead can be poured. I then pour the melted lead between the convex face and the bearing-surface. When the lead has sufficiently cooled, I remove the said form and place and fasten another proper form with a larger convex face, leaving between the lead face, formed as above stated, and the convex face of the last-mentioned form a suitable space, into which the melted Babbitt can be poured. I then pour the melted Babbitt into the last-mentioned space. I thus obtain a well-welded bearing of these metals.

I do not claim as new the idea of trimming a brass bearing and welding lead thereon; nor do I claim as new the idea of welding a piece of lead to a piece of Babbitt. I only claim as new the combination, as above described, of three metals to form a bearing.

Having thus fully described my invention, what I claim as new, and desire to secure by Letters Patent, is—

In a journal or bearing, the combination of the brass bearing with a lead covering upon its bearing-surface and welded thereto, and with a Babbitt covering or surface upon the lead covering and welded thereto, the three metals being thus welded together, substantially as and for the purposes herein set forth.

In testimony whereof I affix my signature in presence of two witnesses.

ROBERT W. TRAYLOR.

Witnesses:
   C. V. MEREDITH,
   EDMD. PENDLETON.